Figure 1:
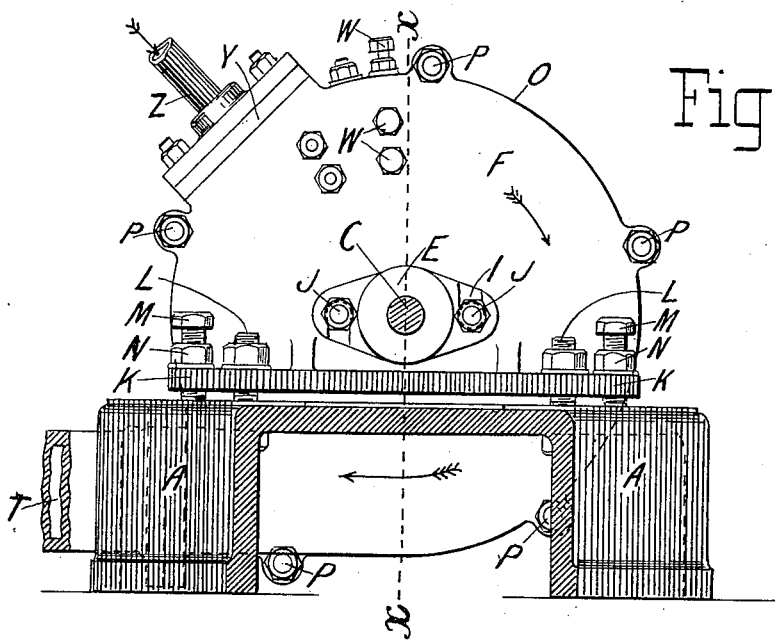

No. 658,384.  
R. F. MARSH.  
ROTARY MOTOR.  
(Application filed Jan. 16, 1900.)

(No Model.)

Patented Sept. 25, 1900.

3 Sheets—Sheet 1.

Witnesses  
George M. Richards  
Wm. R. Davis

Inventor  
Richard Francis Marsh  
by W. H. Babcock  
Atty

THE NORRIS PETERS CO., PHOTO-LITHO., WASHINGTON, D. C.

No. 658,384. Patented Sept. 25, 1900.
R. F. MARSH.
ROTARY MOTOR.
(Application filed Jan. 16, 1900.)
(No Model.) 3 Sheets—Sheet 2.

Witnesses
George D. Richards
Wm. R. Davis

Inventor:
Richard Francis Marsh
by W. H. Babcock, Atty.

No. 658,384. Patented Sept. 25, 1900.
R. F. MARSH.
ROTARY MOTOR.
(Application filed Jan. 16, 1900.)
(No Model.) 3 Sheets—Sheet 3.
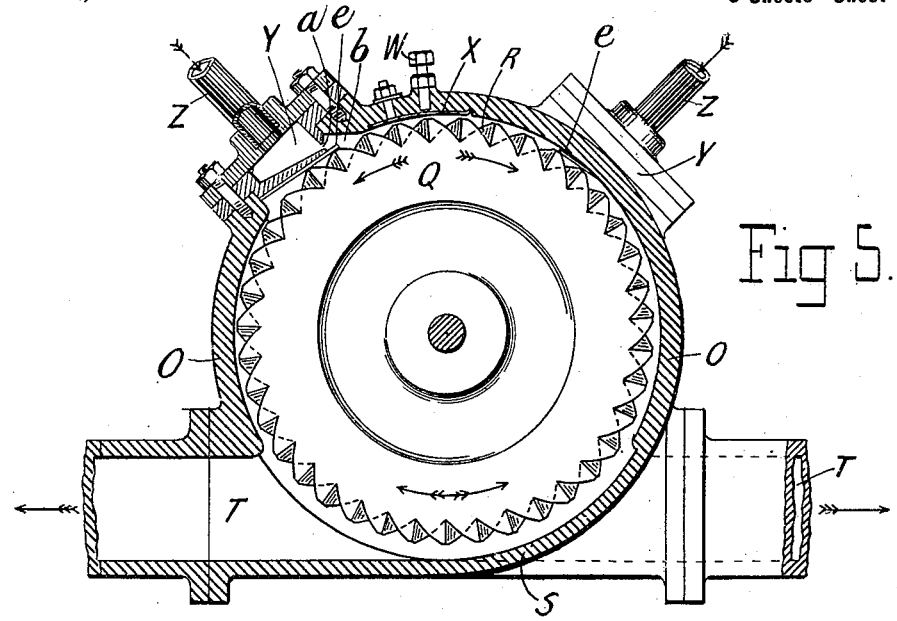
Fig 5.
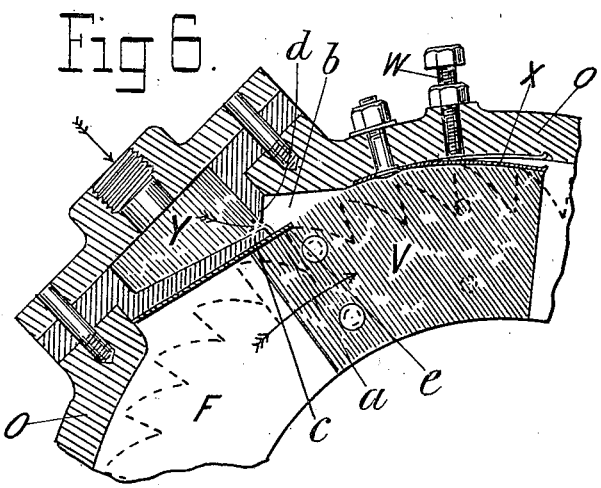
Fig 6.
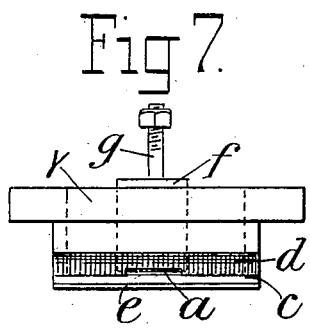
Fig 7.
Fig 10.
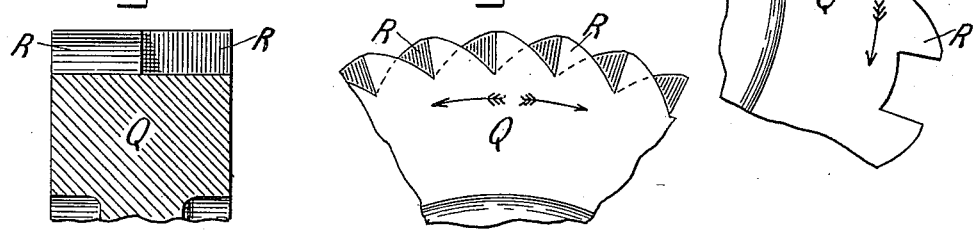
Fig 8. Fig 9.
Witnesses
George M. Richards
Wm. R. Davis
Inventor
Richard Francis Marsh
by W. H. Babcock
Atty
THE NORRIS PETERS CO., PHOTO-LITHO., WASHINGTON, D. C.

UNITED STATES PATENT OFFICE.

RICHARD FRANCIS MARSH, OF EAST MAITLAND, NEW SOUTH WALES.

ROTARY MOTOR.

SPECIFICATION forming part of Letters Patent No. 658,384, dated September 25, 1900.

Application filed January 16, 1900. Serial No. 1,710. (No model.)

*To all whom it may concern:*

Be it known that I, RICHARD FRANCIS MARSH, engineer, a subject of the Queen of Great Britain and Ireland, and a resident of East Maitland, in the Colony of New South Wales, have invented a certain new and useful Improved Rotary Motor to be Operated by Fluid-Pressure, of which the following is a specification.

This invention relates to the construction and mode of operating rotary motors provided with a disk or disks revolving within an outer casing and operated by fluid-pressure. It is designed with a view to increasing the efficiency of such motors and cheapening the cost of their construction, working, and maintenance, and comprises the use of a peculiarly-constructed outer casing having one or more fluid-pressure chambers suitably attached, either fixed or removable and in direct communication with the supply-pipe used for conveying the operating fluid. The said pressure-chamber is provided with a suitable outlet-slot, through which the escaping fluid passes to the rotary disk. This outlet-slot may also be provided with means for diminishing and enlarging its dimensions, and adjacent thereto is placed a projecting lip, which may be either fixed, flexible, or adjustable, to act as a director for the operating fluid. On the outlet side of the said slot and immediately above it a recess is formed in the outer casing, which, in conjunction with the projecting part of the fluid-pressure chamber, serves as a reaction-chamber and to control and direct the fluid. The aforesaid lip is so located as to slightly bear upon the points of the serrations formed upon the revolving disk. In the immediate vicinity of the pressure-chamber suitable recesses are provided, both in the inner portion of the circumferential part of the casing and on the sides, to receive adjustable plates, two of which are adjusted to slightly touch the sides of the rotary disk, and another is employed to take a bearing upon the points of the serrations. These plates are made flexible and are used to assist in confining and directing the operating fluid, causing it to impinge upon the serrations. If shrouded disks are used, it is only necessary to use the upper adjustable plate. The main casing inclosing the disk is made adjustable, as are also the associated stuffing-boxes through which the disk-spindle passes. The supporting main bearings which carry the disk are made independent of the casing, the object being to establish the accurate adjustment of the casing, so as to accommodate it to the changing conditions incidental to wear. To provide for the rapid exit of the expended pressure fluid, the circumferential portion of the casing connected with the exhaust-port is suitably enlarged. The disks are constructed to operate in either direction and the inlet-pressure chambers and the exhaust-ports are relatively placed to obtain the results desired.

Figure 2:
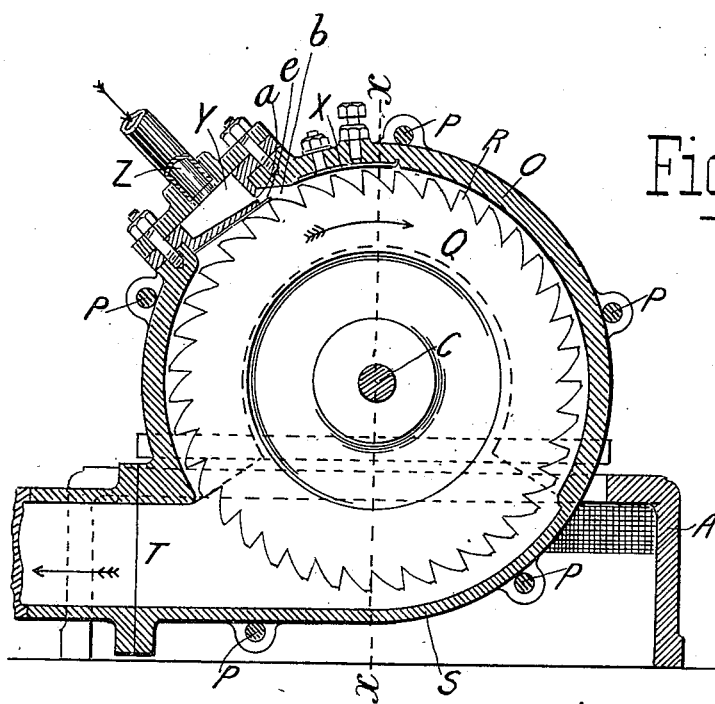
Figure 3:
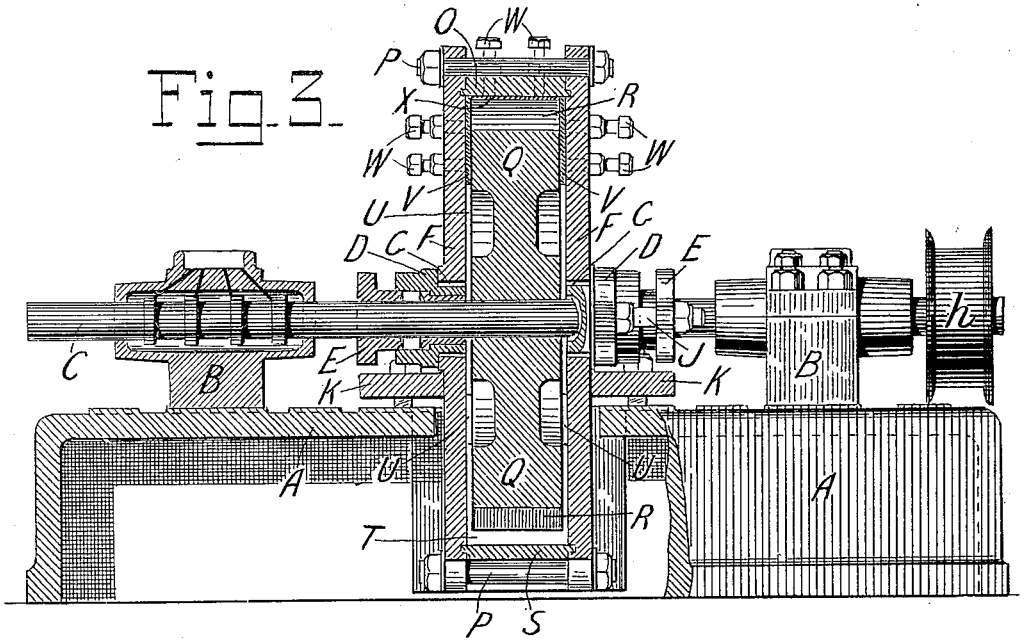
Figure 4:
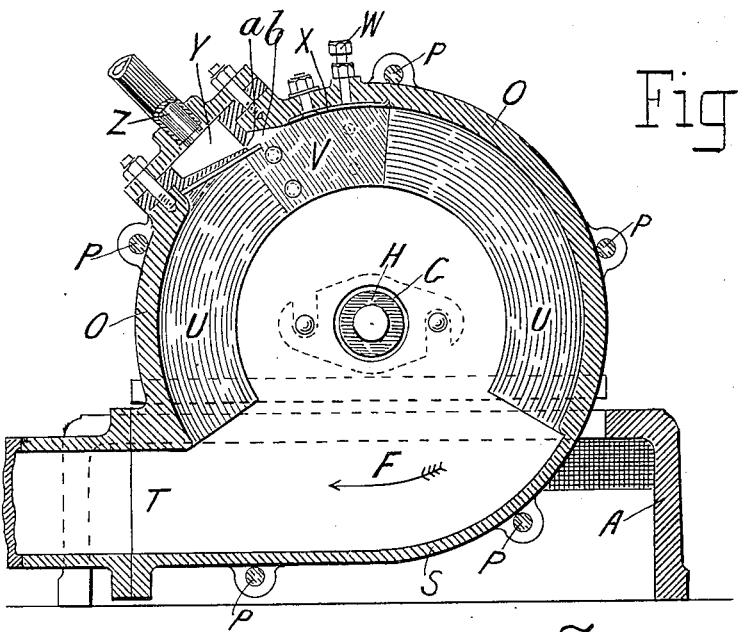

Referring to the drawings which form part of this specification, Figure 1 is an end elevation showing casing and foot-plate with means for adjusting same. Fig. 2 is a sectional elevation showing outer casing with disk and fluid-pressure chamber in position. Fig. 3 is a transverse sectional elevation on line *x x* of Figs. 1 and 2. Fig. 4 is a similar section to Fig. 2 with the disk removed. Fig. 5 is a sectional elevation showing casing constructed for double-action disk. Fig. 6 is an enlarged detail of a fluid-pressure chamber, reaction-chamber, and associated directing-plates. Fig. 7 is an end elevation of a fluid-pressure chamber, showing outlet-slot. Fig. 8 is a detail showing in section a portion of a disk provided with double serrations. Fig. 9 is a side view of Fig. 8. Fig. 10 shows an alternative method of constructing disk serrations to produce reverse movements of the motor as applied to one disk.

Upon the sole-plate A are secured the independent spindle-bearings B, one of which is shown in section in Fig. 3. The spindle C may be of any desired length or may be coupled to a secondary shaft by means of any well-known forms of coupling and may be provided with thrust or other collars, if necessary. The adjustable stuffing-boxes D and the glands E, which also carry the said spindles, are secured to the side plates F, which form part of the disk-casing. The enlarged central hole G receives the loosely-fitting boss H. A loosely-fitting gapped flange I is held in position by bolts or studs J. The foot-plates K are secured to the sole-plate A by the bolts L and are adjusted as may be required by means of the set-screws M, provided with the clamping-nuts N. The adjustable stuffing-boxes D and the foot-plates K, with their set-screws, are provided, so that the casing may be adjusted expeditiously and accurately in the event of wear taking place in the independent bearings B and for the purpose of maintaining the disk in its correct relative position, which is slightly out of the center, so as to form the smaller passage nearest to the pressure-chamber and adjustable director-plates. The circumferential portion O of the casing may either be an integral part of a side plate F or may be bolted thereto with the clamping-bolts P, or the side plates may be independent of that portion. The disk Q, having serrations R, is secured to the spindle C. The said serrations are provided with impelling and following surfaces, the impelling-surface being placed so as to meet the inflowing fluid. The diminished part S of the circumferential portion O of the casing provides a clear passage-way for the expended fluid to pass into the exhaust-port T. The enlargement of this passage may also be accomplished by other means, such as by the removal of a portion of the casing or by providing a set-off in the casting. The inner facing-strips U, formed on the side plates F, (vide Figs. 3 and 4,) are recessed to receive the flexible directing-plates V, which are secured in position and provided with set-screws W or other suitable means for adjusting them against the sides of the disk. A similar plate X is also placed in a recess formed in the circumferential part O, and is similarly adjusted, so as to slightly bear upon the points of the disk-serrations R. The object of these flexible plates is to confine the pressure fluid sufficiently to prolong its operating influence and to prevent its dispersion or vitiation at too early a stage of the operation. The fluid-pressure chamber Y is situated in the circumferential part O of the outer casing and may be either fixed or removable, as may be considered necessary, and if removable may be made reversible to operate the motor in either direction. The said chamber is in direct communication with the supply-pipe Z, from whence the fluid used enters the chamber and passes out of the slot a, which is made the desired width and length, the latter not necessarily being the same width as the disk-serrations or pressure-chamber. (Vide Fig. 7).

To provide for an absolutely-free egress of the pressure fluid and in order to create a reaction-chamber b, the obstructive outer portion of the metal surrounding the slot is removed both from the bottom portion c and the front part d, so that only the slot remains, and the surfaces which have thus been created form, together with the impelling and following portions of the disk-serrations, a peculiarly-constructed chamber, in which the operating fluid performs the work of rotating the disk most effectively. A projecting lip e is provided immediately below the slot a, which may be either fixed, flexible, or adjustable, and may be in the form of a flexible plate and secured on the under side of the bottom portion c of the pressure-chamber and take a slight bearing upon the points of the disk serrations. This projecting lip serves as a director-plate for the fluid as it escapes throught the slot a, guiding it into the right direction and in a manner that will be most serviceable to produce the desired results. To provide for altering the dimensions of the slot a, an adjustable plate f may be used, such as is shown in Fig. 7, which may be regulated by means of the adjusting-screw g or other suitable device. Such a plate may also be made to form an adjustable side of the said slot. Sight-holes, to be covered by flanges, may be placed in suitable positions in the outer casing for the purpose of inspecting the parts referred to herein, which require adjustment.

The action of this rotary motor is as follows: the operating fluid having entered the chamber Y and passed out through the slot a into the reaction-chamber b is by the peculiar construction of that chamber caused to pass into the serrations, acting upon the impelling-surfaces confined between the said chamber b and the directing-plates V and X and producing a rotary movement of high velocity, resulting in the development of great force.

A feature of this invention is that the expended fluid when discharged from the outlet-port would in the case of steam have expended its energy to such an extent as to appear in the form of vapor wholly expanded.

The form and location of the exhaust may be varied to suit the changing conditions of manufacture, which would vary according to the purpose to which the motor would be applied.

To regulate the ingress of the pressure fluid, governors of any suitable type may be used, the pulley h being provided for that purpose.

Where double serrations are provided upon one disk, as in Figs. 8, 9, and 10, the associated pressure-chambers and director-plates, together with the outlet passages and ports, are suitably placed to obtain the desired reverse motions; but where casings are provided with separate rotary disks to operate in reverse directions the inoperative disk for the time being serves as a fly-wheel. In either case the pressure-chambers and the director-plates and other necessary associated parts occupy the relative positions essential to obtaining motion in the desired direction. This form of rotary motor in either of the forms described is serviceable for many purposes to which engines are adapted.

Having now described my invention, I desire to state that I am aware that a revolving disk and an outer casing are not in themselves novel, but when associated with the peculiar features embraced by this invention they are capable of producing results not heretofore obtained. Therefore,

What I claim as new, and desire to secure by Letters Patent, is—

1. In rotary motors of the class set forth, the combination, with a fluid-pressure chamber, of, an adjustable plate for regulating the dimensions of the outlet-slot of the said chamber and a projecting lip extending from the rear wall of the said chamber under the whole of the said chamber and beyond the opposite or forward wall thereof, as described and shown, and for the purposes set forth.

2. In rotary motors of the class set forth, an upper adjustable plate and adjustable side plates, placed within the casing in close proximity to the fluid-pressure chamber, and a projecting lip extending from the rear wall of the said chamber under the whole of the said chamber and beyond the opposite or forward wall thereof, as described and shown, and for the purposes set forth.

3. In rotary motors of the class set forth, a projecting lip, a passage in close proximity thereto, an upper and two side directing-plates, and, serrations constructed upon a rotary disk, all forming a reaction-chamber in communication with an outlet-slot of a fluid-pressure chamber, as herein described and shown, and for the purposes set forth.

4. In rotary motors of the class set forth, the combination, with a casing having upper and side adjustable director-plates, of, adjustable stuffing-boxes and foot-plates provided with means for adjusting the position of said casing relatively to an inclosed rotary disk whose serrations are in contact with a projecting lip of a fluid-pressure chamber, as described and shown and for the purposes set forth.

5. In rotary motors of the class set forth, an outer casing having upper and side director-plates and provided with inner side facing-strips, the lower part of such casing being of a diminished thickness so as to form an outlet-passage for the expended fluid, and communicating with an exhaust-port, as described and shown.

In witness whereof I have hereunto set my hand in presence of two witnesses.

RICHARD FRANCIS MARSH.

Witnesses:
HARRY A. SMEDLEY,
LESLIE F. PHILLIPS.